United States Patent
Hyun et al.

(10) Patent No.: US 9,689,750 B2
(45) Date of Patent: Jun. 27, 2017

(54) TEMPERATURE SENSORS

(71) Applicant: SK hynix Inc., Icheon-si, Gyeonggi-do (KR)

(72) Inventors: Sang Ah Hyun, Chungju-si (KR); Hee Joon Lim, Cheongju-si (KR)

(73) Assignee: SK hynix Inc., Icheon-si (KR)

( * ) Notice: Subject to any disclaimer, the term of this patent is extended or adjusted under 35 U.S.C. 154(b) by 469 days.

(21) Appl. No.: 14/299,660

(22) Filed: Jun. 9, 2014

(65) Prior Publication Data

US 2015/0211939 A1    Jul. 30, 2015

(30) Foreign Application Priority Data

Jan. 28, 2014   (KR) .................. 10-2014-0010069

(51) Int. Cl.
*G01K 7/16*   (2006.01)
*G01K 7/01*   (2006.01)

(52) U.S. Cl.
CPC .............. *G01K 7/16* (2013.01); *G01K 7/015* (2013.01)

(58) Field of Classification Search
CPC .. G01K 7/01; G01K 7/21; G01K 7/25; G01K 7/16
See application file for complete search history.

(56) References Cited

U.S. PATENT DOCUMENTS

| | | | | |
|---|---|---|---|---|
| 5,881,364 A * | 3/1999 | Higuchi | ............. | H04L 25/061 340/7.2 |
| 5,973,632 A * | 10/1999 | Tai | ............. | H03M 1/069 341/155 |
| 7,127,368 B2 * | 10/2006 | Choi | ............. | G01K 7/01 327/512 |
| 7,581,881 B2 * | 9/2009 | Kim | ............. | G01K 7/01 374/170 |
| 7,936,204 B2 * | 5/2011 | Im | ............. | G01K 7/01 323/314 |
| 7,936,616 B2 * | 5/2011 | Jeong | ............. | G01K 3/005 365/189.07 |

(Continued)

FOREIGN PATENT DOCUMENTS

CN     102853931 A  *  1/2013
DE           333094 A1 *  3/1985

(Continued)

*Primary Examiner* — Gail Kaplan Verbitsky
(74) *Attorney, Agent, or Firm* — William Park & Associates Ltd.

(57) ABSTRACT

The temperature sensor includes a voltage generator and a temperature code generator. The voltage generator includes a first temperature element having a first resistance value and a second temperature element having a second resistance value and utilizes the first and second temperature elements to generate a temperature voltage signal having a voltage level that varies according to a variation in temperature. The voltage generator generates a reference voltage signal having a substantially constant voltage level regardless of the variation in temperature. The temperature code generator compares a voltage level of the temperature voltage signal with a voltage level of the reference voltage signal to generate a plurality of temperature code signals including information on the variation in temperature based on the comparison.

9 Claims, 5 Drawing Sheets

(56) References Cited

U.S. PATENT DOCUMENTS

| | | | |
|---|---|---|---|
| 8,192,082 B2* | 6/2012 | Song | G01K 3/005 374/170 |
| 8,659,966 B2* | 2/2014 | Choi | G11C 7/04 365/185.18 |
| 8,705,273 B2* | 4/2014 | Kim | G11C 5/14 365/185.03 |
| 8,876,374 B2* | 11/2014 | Jeong | G01K 7/21 374/163 |
| 9,007,863 B1* | 4/2015 | Song | G11C 11/40615 365/212 |
| 9,397,661 B2* | 7/2016 | Ha | H03K 19/0005 |
| 2004/0004992 A1* | 1/2004 | Aota | G01K 7/01 374/163 |
| 2005/0276139 A1* | 12/2005 | Choi | G11C 11/406 365/211 |
| 2008/0018482 A1* | 1/2008 | Chiu | G01K 7/015 340/584 |
| 2011/0029272 A1* | 2/2011 | Lee | G01K 1/02 702/130 |
| 2011/0158286 A1* | 6/2011 | Peterson | G01K 7/01 374/170 |
| 2011/0234298 A1 | 9/2011 | Suzuki | |
| 2014/0294047 A1* | 10/2014 | Jeong | G01K 7/21 374/183 |
| 2015/0211939 A1* | 7/2015 | Hyun | G01K 7/16 374/183 |
| 2015/0226614 A1* | 8/2015 | Matsumoto | G01K 7/00 374/171 |

FOREIGN PATENT DOCUMENTS

| KR | 100410633 B1 * | 12/2003 |
| KR | 20100072832 A * | 7/2010 |
| KR | 1020130123903 A | 11/2013 |

* cited by examiner

TEMPERATURE SENSORS

CROSS-REFERENCE TO RELATED APPLICATION

The present application claims priority under 35 U.S.C 119(a) to Korean Application No. 10-2014-0010069, filed on Jan. 28, 2014, in the Korean Intellectual Property Office, which is incorporated herein by reference in its entirety as set forth in full.

BACKGROUND

1. Technical Field

Embodiments relate to temperature sensors.

2. Related Art

With the development of increasingly higher performance electronic systems, such as for example personal computers and communication systems, in the electronics industry, the demand for relatively faster memory devices with higher integration characteristics are on the rise. An example of such a memory device is a dynamic random access memory device (DRAM). When semiconductor devices, such as the DRAM devices, are used in cellular phones and notebook computers, the semiconductor devices are often designed to have relatively low power consumption characteristics. Efforts have been directed towards reducing the operating current and the standby current of the semiconductor devices.

The data retention characteristic of DRAM cells including a single transistor and a single storage capacitor may be relatively sensitive to variations in temperature. In many cases, the operating conditions of the internal circuit blocks in a semiconductor integrated circuit may be adjusted based on variations in circumferential temperatures. For example, DRAM devices employed in mobile systems may be designed to adjust a refresh cycle time according to variations in the circumferential temperature. Temperature sensors, such as digital temperature sensor regulators (DTSRs) and analog temperature sensor regulators (ATSRs), are often used to adjust the operating conditions of semiconductor devices, such as DRAM devices, in response to variations in circumferential temperatures. Temperature sensors may detect a relatively high temperature and the operation cycle time may be adjusted to reduce power consumption in a self-refresh mode. The temperature sensors may monitor circumferential temperatures in a normal operation mode.

SUMMARY

In an embodiment, a temperature sensor includes a voltage generator and a temperature code generator. The voltage generator includes a first temperature element having a first resistance value and a second temperature element having a second resistance value and utilizes the first and second temperature elements to generate a temperature voltage signal having a voltage level that varies according to a variation in temperature. The voltage generator generates a reference voltage signal having a substantially constant voltage level regardless of the variation in temperature. The temperature code generator compares a voltage level of the temperature voltage signal with a voltage level of the reference voltage signal and generates a plurality of temperature code signals including information on the variation in temperature based on the comparison.

In an embodiment, a temperature sensor includes a voltage generator and a temperature code generator. The voltage generator utilizes first, second, third and fourth temperature elements having different resistance values to generate a pre-temperature voltage signal having a voltage level that varies according to a variation in temperature. The voltage generator adjusts a voltage level of the pre-temperature voltage signal to generate a temperature voltage signal. The voltage generator generates a reference voltage signal having a substantially constant voltage level regardless of the variation in temperature. The temperature code generator compares a voltage level of the temperature voltage signal with a voltage level of the reference voltage signal and generates a plurality of temperature code signals including information on the variation in temperature based on the comparison.

DETAILED DESCRIPTION OF THE EMBODIMENTS

Various embodiments will be described hereinafter with reference to the accompanying drawings. The embodiments described herein are for illustrative purposes.

Figure 1:
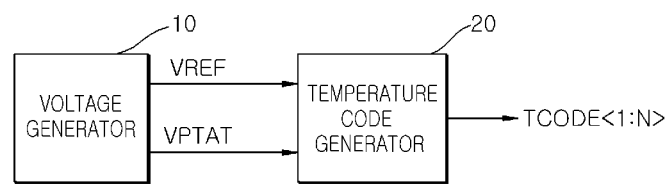
FIG. 1 is a block diagram representation of an embodiment of a temperature sensor.

Referring to FIG. 1, an embodiment of a temperature sensor may include a voltage generator 10 and a temperature code generator 20.

The voltage generator 10 may include a first temperature element (N12 shown in FIG. 2) having a first resistance value and a second temperature element (N13 shown in FIG. 2) having a second resistance value. The voltage generator 10 may utilize the first and second temperature elements N12, N13 to generate a temperature voltage signal VPTAT. The level of the temperature voltage signal VPTAT varies according to variations in temperature. The voltage generator 10 may generate a reference voltage signal VREF having a relatively constant voltage level regardless of the value of the temperature. The generation of the temperature voltage signal VPTAT using the first and second resistance values of the first and second temperature elements N12, N13 will be described below. A voltage level of the temperature voltage signal VPTAT may be set to increase or decrease in response to a rise in the temperature.

The temperature code generator 20 may compare a level of the temperature voltage signal VPTAT with a level of the reference voltage signal VREF and responsively generate a plurality of temperature code signals TCODE<1:N>. The temperature code signals TCODE<1:N> may include information on temperature variation.

Figure 2:
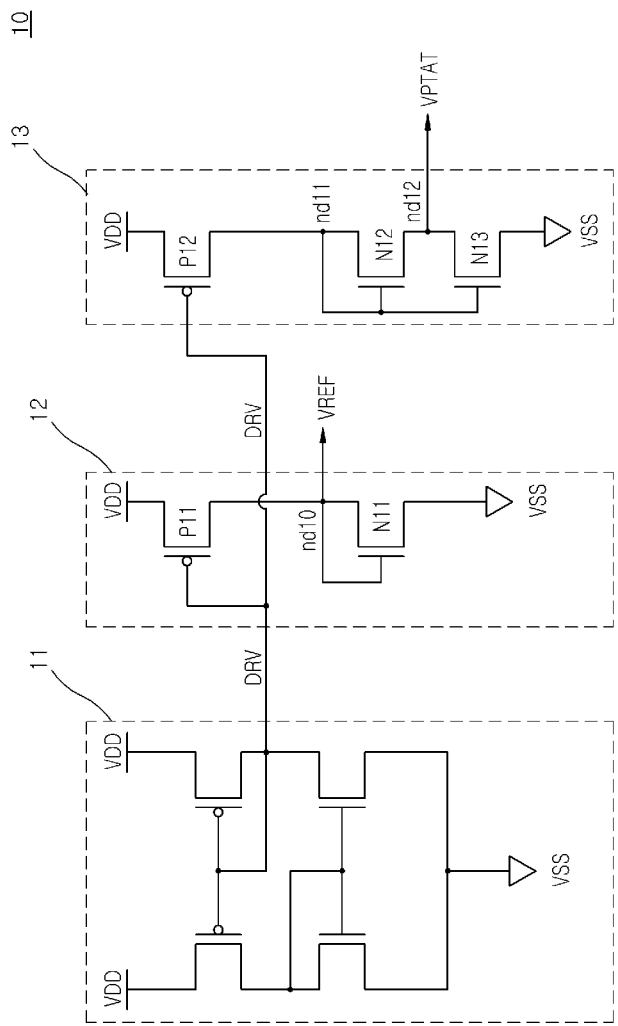
FIG. 2 is a circuit diagram representation of a voltage generator of the temperature sensor of FIG. 1.

Referring to FIG. 2, the voltage generator 10 may include a drive voltage generator 11, a reference voltage generator 12 and a driver 13.

The drive voltage generator 11 may generate a drive voltage signal DRV having a relatively constant voltage level regardless of variations in temperature. The drive voltage generator 11 may be implemented using a band gap voltage generation circuit or a Widlar voltage generation circuit.

The reference voltage generator 12 may include a first drive element P11 and a second drive element N11. The first drive element P11 and the second drive element N11 are electrically coupled in series. The first drive element P11 may be electrically coupled between a power supply voltage VDD terminal and a node ND10 and supply electric charge from the power supply voltage VDD terminal to the node ND10 based on a voltage level of the drive voltage signal DRV. An example of the first drive element is a PMOS transistor. The second drive element N11 may be electrically coupled between the node ND10 and a ground voltage VSS terminal. An example of the second drive elements N11 is a NMOS transistor. A gate of the NMOS transistor N11 may be electrically coupled to the node ND10 such that the NMOS transistor N11 operates in a saturation region. The NMOS transistor N11 may be turned on in response to a voltage level of the node ND10. The second drive element N11 may be implemented using a saturated NMOS transistor acting as a diode to generate a constant current regardless of variations in temperature. The reference voltage generator 12 may output the reference voltage signal VREF having a constant voltage level via the node ND10 regardless of variations in temperature.

The driver 13 may include a third drive element P12, a first temperature element N12 and a second temperature element N13. An example of the third drive element P12 is a PMOS transistor. An example of the first temperature element N12 is an NMOS transistor. An example of the second temperature element N13 is an NMOS transistor. The third drive element P12 may be electrically coupled between the power supply voltage VDD terminal and a node ND11 and supply electric charge from the power supply voltage VDD terminal to the node ND11 based on a voltage level of the drive voltage signal DRV. The first temperature element N12 may be electrically coupled between the node ND11 and a node ND12. The temperature voltage signal VPTAT is generated at the node ND12. A gate of the NMOS transistor N12 may be electrically coupled to the node ND11 such that the NMOS transistor N12 operates in a saturation region to act as a diode. The first temperature element N12 may be turned on in response to a voltage level at the node ND11. The second temperature element N13 may be electrically coupled between the node ND12 and the ground voltage VSS terminal. A gate of the NMOS transistor N13 may be electrically coupled to the node ND11. The second temperature element N13 may be turned on in response to a voltage level at the node ND11. The first temperature element N12 may be configured such that a current flowing through the first temperature element N12 increases or decreases as the temperature rises. Similarly, the second temperature element N13 may be configured such that a current flowing through the second temperature element N13 increases or decreases as the temperature rises.

An operation for adjusting a voltage level of the temperature voltage signal VPTAT based on the first and second resistance values of the first and second temperature elements N12, N13, respectively, will be described with reference to an example where the first and second temperature elements N12, N13 operate in a saturation mode in response to a voltage at the node ND11 to generate substantially the same current.

The operation for setting the resistance values of the first and second temperature elements N12, N13 will be described hereinafter.

The first resistance value of the first temperature element N12 may be adjusted based on a threshold voltage of the first temperature element N12 or according to a ratio of a channel length and a channel width of the first temperature element N12. Similarly, the second resistance value of the second temperature element N13 may be adjusted based on a threshold voltage of the second temperature element N13 or according to a ratio of a channel length and a channel width of the second temperature element.

The operation for adjusting a voltage level of the temperature voltage signal VPTAT will be described hereinafter.

A voltage level of the node ND11 may be divided by the resistance values of the first and second temperature elements N12, N13 where the first and second temperature elements N12, N13 are serially electrically coupled between the node ND11 and the ground voltage VSS terminal. The temperature voltage signal VPTAT may be generated from the node ND12 where the node ND12 is electrically coupled between the first and second temperature elements N12, N13. The voltage level of the temperature voltage signal VPTAT may be adjusted based on the resistance values of the first and second temperature elements N12, N13.

Figure 3:
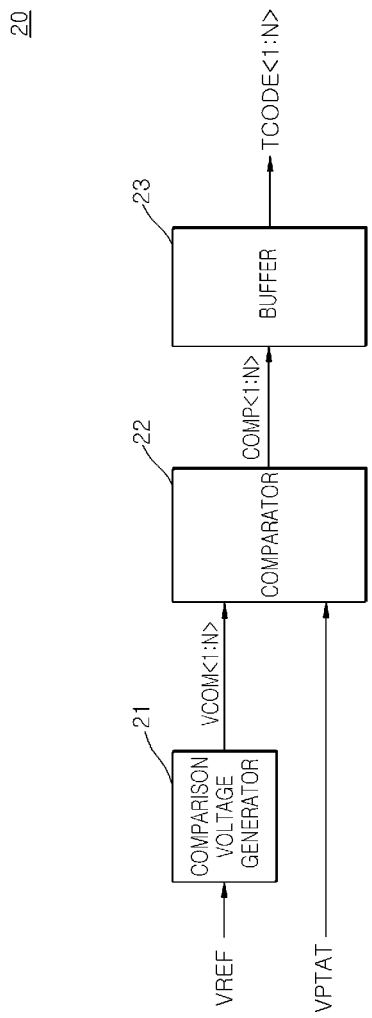
FIG. 3 is a block diagram representation of a temperature code generator of the temperature sensor of FIG. 1.

Referring to FIG. 3, the temperature code generator 20 may include a comparison voltage generator 21, a comparator 22 and a buffer 23.

The comparison voltage generator 21 may receive the reference voltage signal VREF as an input and responsively generate a plurality of comparison voltage signals VCOM<1:N>. The voltage level of each sequential comparison voltage signal of the plurality of comparison voltage signals VCOM<1:N> is relatively higher. The comparison voltage generator 21 may be implemented using, for example, a voltage division circuit that generates a plurality of voltage signals where each sequential voltage signal of the plurality of voltage signals is relatively higher.

The comparator 22 may compare each of the plurality of comparison voltage signals VCOM<1:N> with the temperature voltage signal VPTAT to generate a plurality of comparison signals COMP<1:N>. The comparator 22 may be implemented using an analog to digital converter (ADC) where the analog to digital converter (ADC) coverts a plurality of input voltage levels into a plurality of digital signals.

The buffer 23 may buffer the plurality of comparison signals COMP<1:N> to generated a plurality of buffered comparison signals COMP<1:N> as a plurality of temperature code signals TCODE<1:N>.

An operation of the temperature sensor having the aforementioned configuration will be described hereinafter with reference to FIGS. 1, 2 and 3 in conjunction with an example where the second resistance value of the second temperature element N13 is set to be relatively greater than the first resistance value of the first temperature element N12 in the generation of the temperature voltage signal VPTAT.

The drive voltage generator 11 may generate a drive voltage signal DRV having a relatively constant voltage level regardless of variations in temperature.

The first drive element P11 of the reference voltage generator 12 may supply electric charges from the power supply voltage VDD terminal to the node ND10 based on the voltage level of the drive voltage signal DRV. The second drive element N11 may be turned on in response to the voltage level at the node ND10. The reference voltage generator 12 may output the reference voltage signal VREF having a relatively constant voltage level via the node ND10 where the reference voltage signal VREF has a relatively constant voltage level regardless of variations in temperature.

The third drive element P12 of the driver 13 may supply electric charges from the power supply voltage VDD terminal to the node ND11 based on the voltage level of the drive voltage signal DRV. The first temperature element N12 may be turned on in response to a voltage level at the node ND11. Since the second resistance value of the second temperature element N13 is relatively greater than the first resistance value of the first temperature element N12, a voltage level of the node ND12 may be relatively higher than the voltage level of the temperature voltage signal VPTAT when the first and second temperature elements N12, N13 have substantially the same resistance value. The voltage level at the ode ND12 is the voltage level of the temperature voltage signal VPTAT. The voltage level of the temperature voltage signal VPTAT may gradually increase as the second resistance value of the second temperature element N13 increases.

The comparison voltage generator 21 may receive the reference voltage signal VREF as a input and responsively generate the plurality of comparison voltage signals VCOM<1:N> The voltage level of each sequential comparison voltage signal of the plurality of comparison voltage signals VCOM<1:N> is relatively higher.

The comparator 22 may compare each of the plurality of comparison voltage signals VCOM<1:N> with the temperature voltage signal VPTAT to generate the plurality of comparison signals COMP<1:N>.

The buffer 23 may buffer the plurality of comparison signals COMP<1:N> and output the buffered comparison signals COMP<1:N> as the plurality of temperature code signals TCODE<1:N>.

As described above, an embodiment of a temperature sensor may adjust the resistance values of the first and second temperature elements N12, N13 to increase a variation of a voltage level of the temperature voltage signal VPTAT where the voltage level of the temperature voltage signal VPTAT varies according to variations in temperature. The temperature sensor may generate the temperature code signals TCODE<1:N> based on the temperature voltage signal VPTAT and may improve the reliability of information regarding variations in the temperature.

Figure 4:
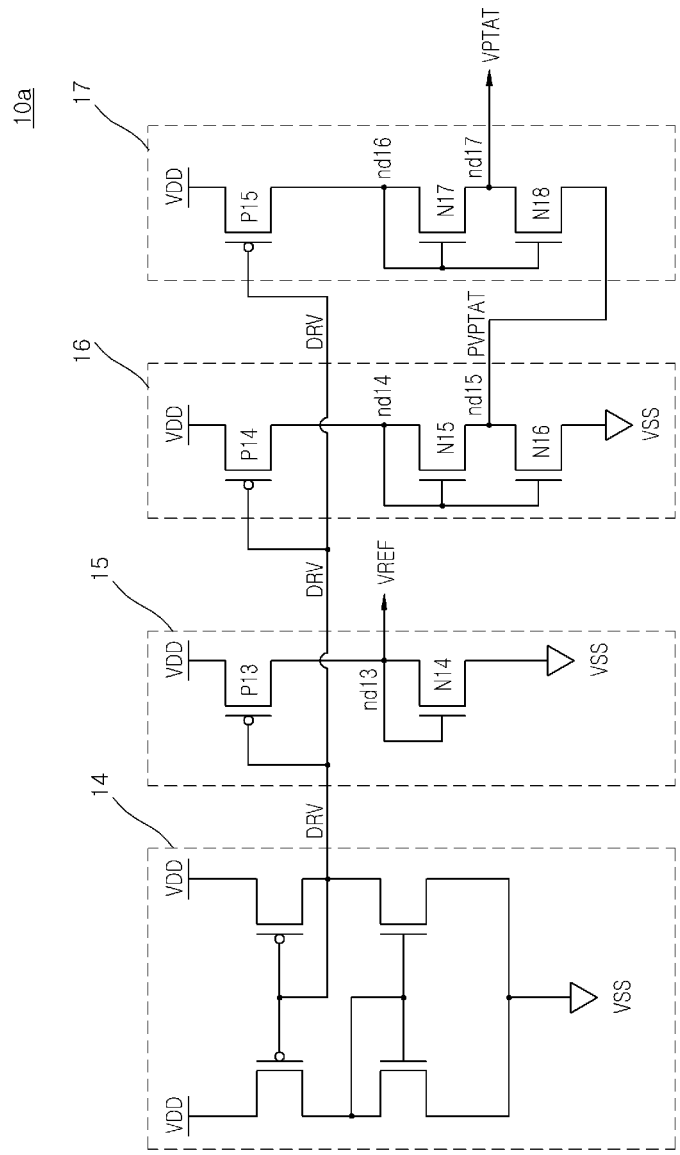
FIG. 4 is a circuit diagram representation of a voltage generator of an embodiment of a temperature sensor.

FIG. 4 is a circuit diagram representation of a voltage generator 10a in an embodiment of a temperature sensor. The voltage generator 10 in the temperature sensor 10 may be replaced with the voltage generator 10a shown in FIG. 4.

The voltage generator 10a may include a drive voltage generator 14, a reference voltage generator 15, a first driver 16 and a second driver 17.

The drive voltage generator 14 may generate a drive voltage signal DRV having a substantially constant voltage level regardless of variations in temperature. The drive voltage generator 14 may be implemented using a band gap voltage generation circuit or a Widlar voltage generation circuit.

The reference voltage generator 15 may include a first drive element P13 and a second drive element N14 electrically coupled in series. The first drive element P13 may be electrically coupled between a power supply voltage VDD terminal and a node ND13 and supply electric charge from the power supply voltage VDD terminal to the node ND13 based on a voltage level of the drive voltage signal DRV. An example of the first drive element P13 is a PMOS transistor. An example of the second drive element N14 is an NMOS transistor. The second drive element N14 may be electrically coupled between the node ND13 and a ground voltage VSS terminal. A gate of the NMOS transistor N14 may be electrically coupled to the node ND13 such that the NMOS transistor N14 operates in a saturation region. The NMOS transistor N14 may be turned on according to a voltage level at the node ND13. The second drive element N14 may be implemented using a saturated NMOS transistor acting as a diode to generate a substantially constant current regardless of variations in temperature. The reference voltage generator 14 may output a reference voltage signal VREF having a substantially constant voltage level through the node ND13 regardless of variations in temperature.

The first driver 16 may include a third drive element P14, a first temperature element N15 and a second temperature element N16. The third drive element P14 may be electrically coupled between the power supply voltage VDD terminal and a node ND14 and supply electric charge from the power supply voltage VDD terminal to the node ND14 based on a voltage level of the drive voltage signal DRV. An example of the third drive element P14 is a PMOS transistor. An example of the first temperature element N15 is an NMOS transistor. An example of the second temperature element N16 is an NMOS transistor. The first temperature element N15 may be electrically coupled between the node ND14 and a node ND15. A pre-temperature voltage signal PVPTAT is generated at the node ND15. A gate of the NMOS transistor N15 may be electrically coupled to the node ND14 such that the NMOS transistor N15 operates in a saturation region to act as a diode. The first temperature element N15 may be turned on in response to a voltage level at the node ND14. The second temperature element N16 may be electrically coupled between the node ND15 and the ground voltage VSS terminal. A gate of the NMOS transistor N16 may be electrically coupled to the node ND14. The second temperature element N16 may be turned on in response to a voltage level at the node ND14. The first temperature element N15 may be configured such that a current flowing through the first temperature element N15 increases or decreases as the temperature rises. Similarly, the second temperature element N16 may be configured such that a current flowing through the second temperature element N16 increases or decreases as the temperature rises.

The second driver 17 may include a fourth drive element P15, a third temperature element N17 and a fourth temperature element N18. An example of the fourth drive element P15 is a PMOS transistor. An example of the third temperature element N17 is an NMOS transistor. An example of the fourth temperature element N18 is an NMOS transistor. The fourth drive element P15 may be electrically coupled between the power supply voltage VDD terminal and a node ND16 and supply electric charge from the power supply voltage VDD terminal to the node ND16 according to a voltage level of the drive voltage signal DRV. The third temperature element N17 may be electrically coupled between the node ND16 and a node ND17. A temperature voltage signal VPTAT is output at the node ND17. A gate of the NMOS transistor N17 may be electrically coupled to the node ND16 such that the NMOS transistor N17 operates in a saturation region to act as a diode. The third temperature element N17 may be turned on in response to a voltage level at the node ND16. The fourth temperature element N18 may be electrically coupled between the node ND17 and the node ND15. The pre-temperature voltage signal PVPTAT is output at the node ND15. A gate of the NMOS transistor N18 may be electrically coupled to the node ND16. The fourth temperature element N18 may be turned on in response to a voltage level at the node ND16. The third temperature element N17 may be configured such that a current flowing through the third temperature element N17 increases or decreases as the temperature rises. Similarly, the fourth temperature element N18 may be configured such that a current flowing through the fourth temperature element N18 increases or decreases as the temperature rises.

Operations for generating the pre-temperature voltage PVPTAT where the voltage level of the pre-temperature voltage PVPTAT varies according to variations in temperature using the first and second temperature elements N15, N16 will be described below. Operations for generating the temperature voltage VPTAT by adjusting the voltage level of the pre-temperature voltage PVPTAT using the third and fourth temperature elements N17, N18 will be described hereinafter. An example where the first, second, third and fourth temperature elements N15, N16, N17, N18 have different resistance values and may operate in a saturation mode to generate substantially the same current with be used in the descriptions.

An operation for setting the resistance values of the first, second, third and fourth temperature elements N15, N16, N17, N18 will be described hereinafter.

The resistance value of the first temperature element N15 may be adjusted based on a threshold voltage of the first temperature element N15 or based on a ratio of a channel length and a channel width of the first temperature element N15. The resistance value of the second temperature element N16 may be adjusted based on a threshold voltage of the second temperature element N16 or based on a ratio of a channel length and a channel width of the second temperature element N16. The resistance value of the third temperature element N17 may be adjusted based on a threshold voltage of the third temperature element N17 or based on a ratio of a channel length and a channel width of the third temperature element N17. The resistance value of the fourth temperature element N18 may be adjusted based on a threshold voltage of the fourth temperature element N18 or based on a ratio of a channel length and a channel width of the fourth temperature element N18.

An operation for adjusting a voltage level of the pre-temperature voltage signal PVPTAT will be described hereinafter.

A voltage level of the node ND14 may be divided by the resistance values of the first and second temperature elements N15, N16 where the first and second temperature elements N15, N16 are serially electrically coupled between the node ND14 and the ground voltage VSS terminal. The pre-temperature voltage signal PVPTAT may be output at the node ND15 between the first and second temperature elements N12. The voltage level of the pre-temperature voltage signal PVPTAT may be adjusted based on the resistance values of the first and second temperature elements N15, N16.

An operation for adjusting a voltage level of the temperature voltage signal VPTAT will be described hereinafter.

A voltage level of the temperature voltage signal VPTAT may be adjusted based on the resistance values of the third and fourth temperature elements N17, N18, where the third and fourth temperature elements N17, N18 are serially electrically coupled between the node ND16 and the node ND15. A voltage level at the node ND15 may correspond to the voltage level of the pre-temperature voltage signal PVPTAT. The voltage level of the temperature voltage signal VPTAT may be relatively higher than the voltage level at the node ND15. The temperature voltage signal VPTAT may be generated to have a relatively higher voltage level than the voltage level of the pre-temperature voltage signal PVPTAT.

An operation of the temperature sensor including the voltage generator 10a having the aforementioned configuration will be described with reference to FIGS. 1, 3, and 4 in conjunction with an example where the first second, third and fourth temperature elements N15, N16, N17, N18 have different resistance values and the temperature voltage signal VPTAT is generated by adjusting a voltage level of the pre-temperature voltage signal PVPTAT with the first, second, third and fourth temperature elements N15, N16, N17, N18.

The drive voltage generator 14 may generate the drive voltage signal DRV having a substantially constant voltage level regardless of the variation in temperature.

The first drive element P13 of the reference voltage generator 15 may supply electric charge from the power supply voltage VDD terminal to the node ND13 based on a voltage level of the drive voltage signal DRV. The second drive element N14 may be turned on in response to a voltage level at the node ND13. The reference voltage generator 15 may output the reference voltage signal VREF having a substantially constant voltage level at the node ND13 regardless of variations in the temperature.

The third drive element P14 of the first driver 16 may supply electric charge from the power supply voltage VDD terminal to the node ND14 based on a voltage level of the drive voltage signal DRV. The first temperature element N15 may be turned on in response to a voltage level at the node ND14. The second temperature element N16 may be turned on in response to a voltage level at the node ND14. A voltage level of the pre-temperature voltage signal PVPTAT may be adjusted according to the resistance values of the first and second temperature elements N15, N16.

The fourth drive element P15 of the second driver 17 may supply electric charge from the power supply voltage VDD terminal to the node ND16 based on a voltage level of the drive voltage signal DRV. The third temperature element N17 may be turned on in response to a voltage level at the node ND16. The fourth temperature element N18 may be turned on in response to a voltage level at the node ND16. A voltage level of the temperature voltage signal VPTAT may be adjusted according to the resistance values of the third and fourth temperature elements N17, N18 where the third and fourth temperature elements N17, N18 are serially electrically coupled between the node ND16 and the node ND15. A voltage level at the node ND15 may correspond to the voltage level of the pre-temperature voltage signal PVPTAT. The voltage level of the temperature voltage signal VPTAT may be relatively higher than the voltage level at the node ND15. The temperature voltage signal VPTAT may be generated to have a voltage level that is higher than the voltage level of the pre-temperature voltage signal PVPTAT.

The comparison voltage generator 21 may receive the reference voltage signal VREF as an input and responsively generate the plurality of comparison voltage signals VCOM<1:N>. The voltage level of each sequential comparison voltage signal of the plurality of comparison voltage signals VCOM<1:N> is relatively higher.

The comparator 22 may compare each of the plurality of comparison voltage signals VCOM<1:N> with the temperature voltage signal VPTAT to generate the plurality of comparison signals COMP<1:N>.

The buffer 23 may buffer the plurality of comparison signals COMP<1:N> and output the buffered comparison signals COMP<1:N> as the plurality of temperature code signals TCODE<1:N>.

As described above, an embodiment of a temperature sensor may adjust a variation of a voltage level of the pre-temperature voltage signal PVPTAT where the voltage level of the pre-temperature voltage signal varies according to variations in temperature using the resistance values of the first and second temperature elements N15, N16 The temperature sensor may increase a voltage level of the temperature voltage signal VPTAT by adjusting the voltage level of the pre-temperature voltage signal PVPTAT. An embodiment of the temperature sensor may generate the temperature code signals TCODE<1:N> from the temperature voltage signal VPTAT and may improve the reliability of information on the temperature variation.

Figure 5:
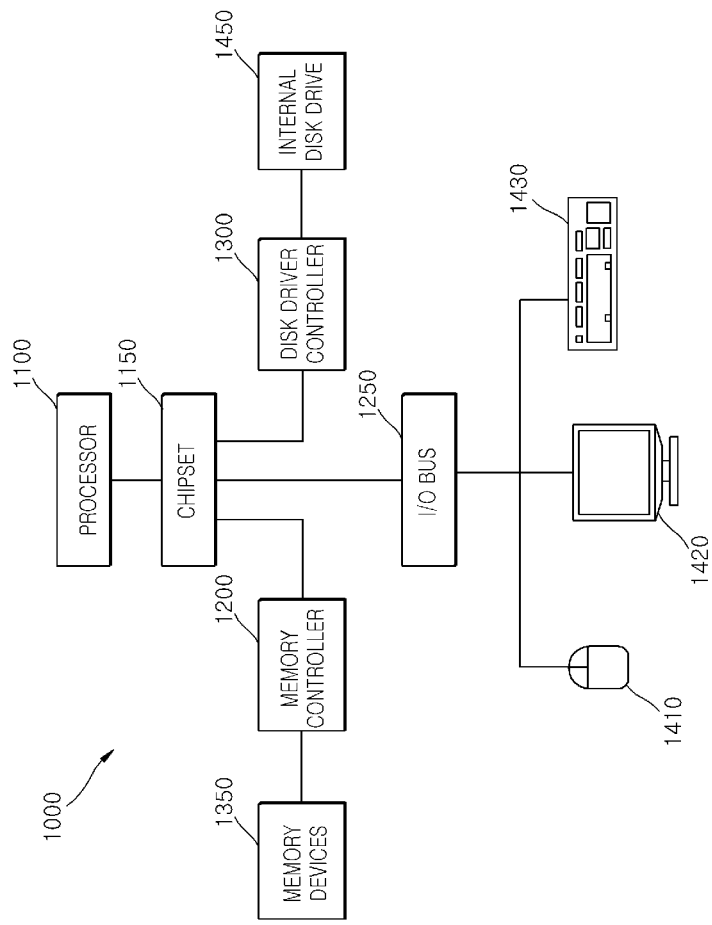
FIG. 5 is a block diagram representation of a system including a semiconductor memory device including an embodiment of a temperature sensor.

Referring to FIG. 5, a block diagram representation of a system 1000 including an embodiment of a semiconductor device 1350 is shown. In an embodiment, the semiconductor device 1350 includes an embodiment of a temperature sensor. In an embodiment, the semiconductor device 1350 is a semiconductor memory device. The system 1000 includes one or more semiconductor memory devices 1350 and a memory controller 1200.

An embodiment of the temperature sensor includes a voltage generator and a temperature code generator. The voltage generator includes a first temperature element having a first resistance value and a second temperature element having a second resistance value and utilizes the first and second temperature elements to generate a temperature voltage signal having a voltage level that varies according to a variation in a temperature. The voltage generator generates a reference voltage signal having a substantially constant voltage level regardless of the variation in temperature. The temperature code generator compares a voltage level of the temperature voltage signal with a voltage level of the reference voltage signal to generate a plurality of temperature code signals including information on the variation in temperature based on the comparison.

An embodiment of a temperature sensor includes a voltage generator and a temperature code generator. The voltage generator utilizes first, second, third and fourth temperature elements having different resistance values to generate a pre-temperature voltage signal having a voltage level that varies according to a variation in temperature. The voltage generator adjusts a voltage level of the pre-temperature voltage signal to generate a temperature voltage signal. The voltage generator generates a reference voltage signal having a substantially constant voltage level regardless of the variation in temperature. The temperature code generator compares a voltage level of the temperature voltage signal with a voltage level of the reference voltage signal and generates a plurality of temperature code signals including information on the variation in temperature based on the comparison.

Examples of the semiconductor memory device 1350 include, but are not limited to, dynamic random access memory, static random access memory, synchronous dynamic random access memory (SDRAM), synchronous graphics random access memory (SGRAM), double data rate dynamic ram (DDR), and double data rate SDRAM.

The memory controller 1200 is used in the design of memory devices, processors, and computer systems. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented.

A chipset 1150 may be electrically coupled to the CPU 1100. The chipset 1150 is a communication pathway for signals between the CPU 1100 and other components of the system 1000, which may include the memory controller 1200, an input/output ("I/O") bus 1250, and a disk drive controller 1300. Depending on the configuration of the system 1000, any one of a number of different signals may be transmitted through the chipset 1150, and those skilled in the art will appreciate that the routing of the signals throughout the system 1000 can be readily adjusted without changing the underlying nature of the system.

The memory controller 1200 may be electrically coupled to the chipset 1150. The memory controller 1200 can receive a request provided from the CPU 1100, through the chipset 1150. In alternate embodiments, the memory controller 1200 may be integrated into the chipset 1150. The memory controller 1200 may be electrically coupled to one or more memory devices 1350. The memory devices 1350 may be any one of a number of industry standard memory types, including but not limited to, single inline memory modules ("SIMMs") and dual inline memory modules ("DIMMs"). The memory devices 1350 may facilitate the safe removal of the external data storage devices by storing both instructions and data.

The chipset 1150 may be electrically coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. The I/O bus 1250 may be integrated into the chipset 1150.

The disk drive controller 1450 may also be electrically coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

The system 1000 described above in relation to FIG. 5 is merely one example of a system employing a semiconductor memory device 1350. In alternate embodiments, such as cellular phones or digital cameras, the components may differ from the embodiment shown in FIG. 5.

While certain embodiments have been described above, it will be understood to those skilled in the art that the embodiments described are by way of example only. Accordingly, the temperature sensor described herein should not be limited based on the described embodiments. Rather, the temperature sensor described herein should only be limited in light of the claims that follow when taken in conjunction with the above description and accompanying drawings.

What is claimed is:
1. A temperature sensor comprising:
a voltage generator suitable for comprising a first temperature element having a first resistance value and a second temperature element having a second resistance value, wherein the voltage generator is suitable for utilizing the first and second temperature elements to generate a temperature voltage signal having a voltage level that varies according to a variation in temperature, and is suitable for generating a reference voltage signal having a substantially constant voltage level regardless of the variation in temperature; and a temperature code generator suitable for comparing a voltage level of the temperature voltage signal with a voltage level of the reference voltage signal to generate a plurality of temperature code signals including information on the variation in temperature based on the comparison, wherein the temperature code generator comprises:

a comparison voltage generator suitable for receiving the reference voltage signal and for generating a plurality of comparison voltage signals having voltage levels that sequentially increase;

a comparator suitable for comparing the plurality of comparison voltage signals with the temperature voltage signal and for generating a plurality of comparison signals; and a buffer suitable for buffering the plurality of comparison signals to output the buffered comparison signals as the plurality of temperature code signals.

2. The temperature sensor of claim 1, wherein the first resistance value is set by one of a threshold voltage of the first temperature element and a ratio of a channel width and a channel length of the first temperature element.

3. The temperature sensor of claim 1, wherein the second resistance value is set by one of a threshold voltage of the second temperature element and a ratio of a channel width and a channel length of the second temperature element.

4. The temperature sensor of claim 1, wherein the voltage generator comprises:

a drive voltage generator suitable for generating a drive voltage signal having a substantially constant voltage level regardless of the variation in temperature;

a reference voltage generator suitable for generating the reference voltage signal in response to the drive voltage signal; and a driver suitable comprising the first and second temperature elements and suitable for generating the temperature voltage signal in response to the drive voltage signal.

5. The temperature sensor of claim 4, wherein the reference voltage generator comprises:

a first drive element electrically coupled between a power supply voltage terminal and a first node and suitable for supplying electric charge from the power supply voltage terminal to the first node in response to the drive voltage signal; and a second drive element electrically coupled between the first node and a ground voltage terminal and suitable for being turned on in response to a voltage level at the first node.

6. The temperature sensor of claim 5, wherein the second drive element is suitable for generating a substantially constant current regardless of the variation in temperature.

7. The temperature sensor of claim 4, wherein the driver comprises:

a third drive element electrically coupled between a power supply voltage terminal and a second node and suitable for supplying electric charge from the power supply voltage terminal to the second node in response to the drive voltage signal;

the first temperature element electrically coupled between the second node and a third node, wherein the temperature voltage signal is output from the third node and turned on in response to a voltage level at the second node; and the second temperature element electrically coupled between the third node and a ground voltage terminal and suitable for being turned on in response to the voltage level at the second node.

8. The temperature sensor of claim 7, wherein a current flowing through the first temperature element varies according to the variation in temperature; and wherein a current flowing through the second temperature element varies according to the variation in temperature.

9. The temperature sensor of claim 7, wherein a voltage level of the temperature voltage signal is adjusted based on the first and second resistance values of the first and second temperature elements.

* * * * *